United States Patent
Fujii et al.

(10) Patent No.: US 10,042,195 B2
(45) Date of Patent: *Aug. 7, 2018

(54) DISPLAY

(71) Applicant: Sony Corporation, Tokyo (JP)

(72) Inventors: Hiroaki Fujii, Kanagawa (JP); Satoshi Mukoyama, Tokyo (JP); Soya Araki, Kanagawa (JP); Hisanori Tsuboi, Kanagawa (JP); Hidetomo Miyake, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,460

(22) Filed: Mar. 20, 2017

(65) Prior Publication Data

US 2017/0192292 A1    Jul. 6, 2017

Related U.S. Application Data

(63) Continuation of application No. 13/463,922, filed on May 4, 2012, now Pat. No. 9,696,571.

(30) Foreign Application Priority Data

May 24, 2011 (JP) .................... 2011-116243

(51) Int. Cl.
*G02F 1/1333* (2006.01)
*G02F 1/1335* (2006.01)

(52) U.S. Cl.
CPC .. *G02F 1/133308* (2013.01); *G02F 1/133615* (2013.01); *G02F 2001/13332* (2013.01);
(Continued)

(58) Field of Classification Search
CPC ......... G02F 1/133308; G02F 1/133615; G02F 2202/28; G02F 2201/46;
(Continued)

(56) References Cited

U.S. PATENT DOCUMENTS 5,701,055 A    12/1997    Nagayama et al.
6,259,496 B1    7/2001    Kashima
(Continued)

FOREIGN PATENT DOCUMENTS

JP    2003255851 A    9/2003
JP    2008103150 A    5/2008
(Continued)

OTHER PUBLICATIONS

Extended European Search Report for Application No. 17178690, dated Aug. 17, 2017.
(Continued)

*Primary Examiner* — Ibrahim A Khan
(74) *Attorney, Agent, or Firm* — Lerner, David, Littenberg, Krumholz & Mentlik, LLP

(57) ABSTRACT

A display includes: a display panel; a front-face member being provided on a front face of the display panel, and the front-face member covering a surrounding section, or the surrounding section and other part of the display panel; and a back-face member having rigidity and being provided on a back face of the display panel, the back-face member covering the back face, or the back face and other part of the display panel.

15 Claims, 4 Drawing Sheets

(52) U.S. Cl.
CPC ............ *G02F 2001/133314* (2013.01); *G02F 2001/133331* (2013.01); *G02F 2201/46* (2013.01); *G02F 2202/28* (2013.01)

(58) Field of Classification Search
CPC .......... G02F 2001/133331; G02F 2001/13332; G02F 2001/133314
See application file for complete search history.

(56) References Cited

U.S. PATENT DOCUMENTS

| | | |
|---|---|---|
| 7,120,010 B2 | 10/2006 | Tajima |
| 8,419,202 B2 | 4/2013 | Ogura et al. |
| 2003/0063231 A1 | 4/2003 | Dai et al. |
| 2003/0117053 A1 | 6/2003 | Tajima |
| 2005/0007322 A1 | 1/2005 | Adachi et al. |
| 2005/0017268 A1 | 1/2005 | Tsukamoto et al. |
| 2005/0184662 A1 | 8/2005 | Cok et al. |
| 2006/0290836 A1 | 12/2006 | Chang |
| 2008/0094831 A1 | 4/2008 | Matsumoto |
| 2009/0066241 A1 | 3/2009 | Yokoyama |
| 2009/0154198 A1* | 6/2009 | Lee ................... G02B 6/0081 362/624 |
| 2009/0185100 A1* | 7/2009 | Matsuhira ............ G02B 6/005 349/58 |
| 2010/0302473 A1 | 12/2010 | Poveda et al. |
| 2010/0315570 A1* | 12/2010 | Mathew ............... G06F 1/1637 349/58 |
| 2011/0012865 A1 | 1/2011 | Nozawa |
| 2011/0051348 A1 | 3/2011 | Song |

FOREIGN PATENT DOCUMENTS

| | | |
|---|---|---|
| JP | 2008-304630 A | 12/2008 |
| JP | 2008-304680 A | 12/2008 |
| WO | 2010082568 A1 | 7/2010 |

OTHER PUBLICATIONS

International Search Report PCT/JP2012/063344, dated Aug. 14, 2012.
European Search Report EP 12166113, dated Oct. 12, 2012.
U.S. Office Action for U.S. Appl. No. 14/118,051, dated Mar. 18, 2015.
Extended European Search Report for EP Application No. 12790195.7, dated May 4, 2015.
EP Communication pursuant to Article 94(3) EPC for EP Application No. 12166113.6, dated Oct. 6, 2015.
Extended European Search Report for Application No. 16184986.4 dated Sep. 28, 2016.

* cited by examiner

DISPLAY

CROSS-REFERENCES TO RELATED APPLICATIONS

The present application is a continuation of U.S. patent application Ser. No. 13/463,922, filed on May 4, 2012, which claims priority from Japanese Patent Application No. JP 2011-116243, filed in the Japanese Patent Office on May 24, 2011, all of which are incorporated herein by reference.

BACKGROUND

The present disclosure relates to a display such as a television device.

There has been a demand for thinner and more lightweight displays, as displays represented by liquid crystal displays, organic electroluminescence displays, electrophoresis-type displays, and the like. In a common display, a display panel is housed in a housing, and this housing is configured to include a front-face housing and a rear-face housing. The front-face housing includes a front bezel, a top chassis, and the like provided on a display surface side of the display panel. The rear-face housing includes a back chassis, a frame, back-face cover, and the like covering a back-face side of the display panel (for example, see Japanese Unexamined Patent Application Publication No. 2008-304630).

SUMMARY

In recent years, designability for appearance of displays such as liquid crystal displays has been improved by advance of technology for display panels and electronic components. However, reducing thickness of the displays and narrowing of frames have been desired for further improvements. Nevertheless, in a currently-available display, as in Japanese Unexamined Patent Application Publication No. 2008-304630, the housing accommodating the display panel, the rear-face housing in particular, is configured to include a plurality of members such as the back chassis, the frame, back-face cover, and the like, preventing a reduction in thickness.

It is desirable to provide a display whose thickness is allowed to be reduced.

According to an embodiment of the present technology, there is provided a display including: a display panel; a front-face member being provided on a front face of the display panel, and the front-face member covering a surrounding section, or the surrounding section and other part of the display panel; and a back-face member having rigidity and being provided on a back face of the display panel, the back-face member covering the back face, or the back face and other part of the display panel.

In the display according to the above-described embodiment of the present technology, the back face of the display panel is covered by a member having rigidity and thus, it is possible to simplify a configuration of the back-face member covering the back face of the display panel.

According to the display in the above-described embodiment of the present technology, a member having rigidity is used as the back-face member of the display panel and thus, it is possible to simplify the configuration of the back-face member and thereby make the display thin.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF EMBODIMENTS

Embodiments of the present disclosure will be described below in detail with reference to the drawings, in the following order.

1. First embodiment (a display in which a front bezel and a back chassis are adhered to each other with a sealant)
2. Second embodiment (a display in which a front bezel and a rear plate are connected to each other with a top chassis and a middle chassis)
3. Third embodiment (a display in which a front glass and a rear plate are adhered to each other with a sealant)
4. Fourth embodiment (a display in which a light guiding plate serves as a back-face member)

1. First Embodiment

Figure 1:
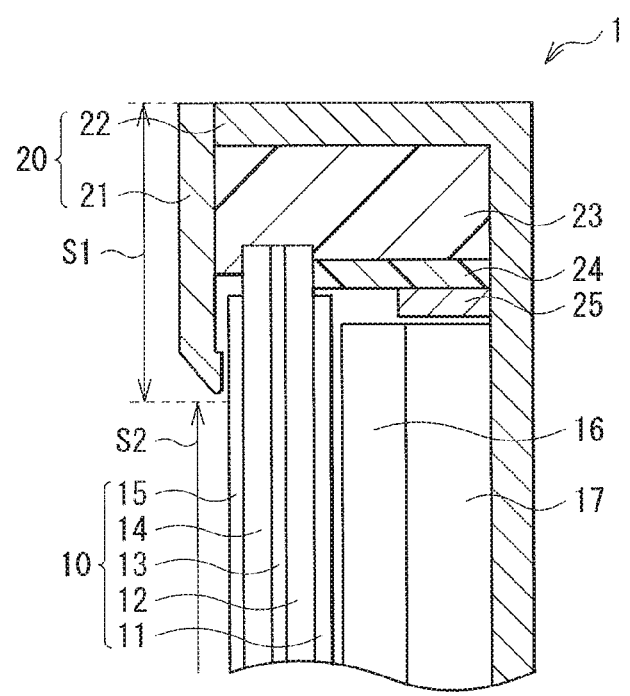
FIG. 1 is a cross-sectional diagram illustrating a configuration of a display according to a first embodiment of the present disclosure.
Figure 2:
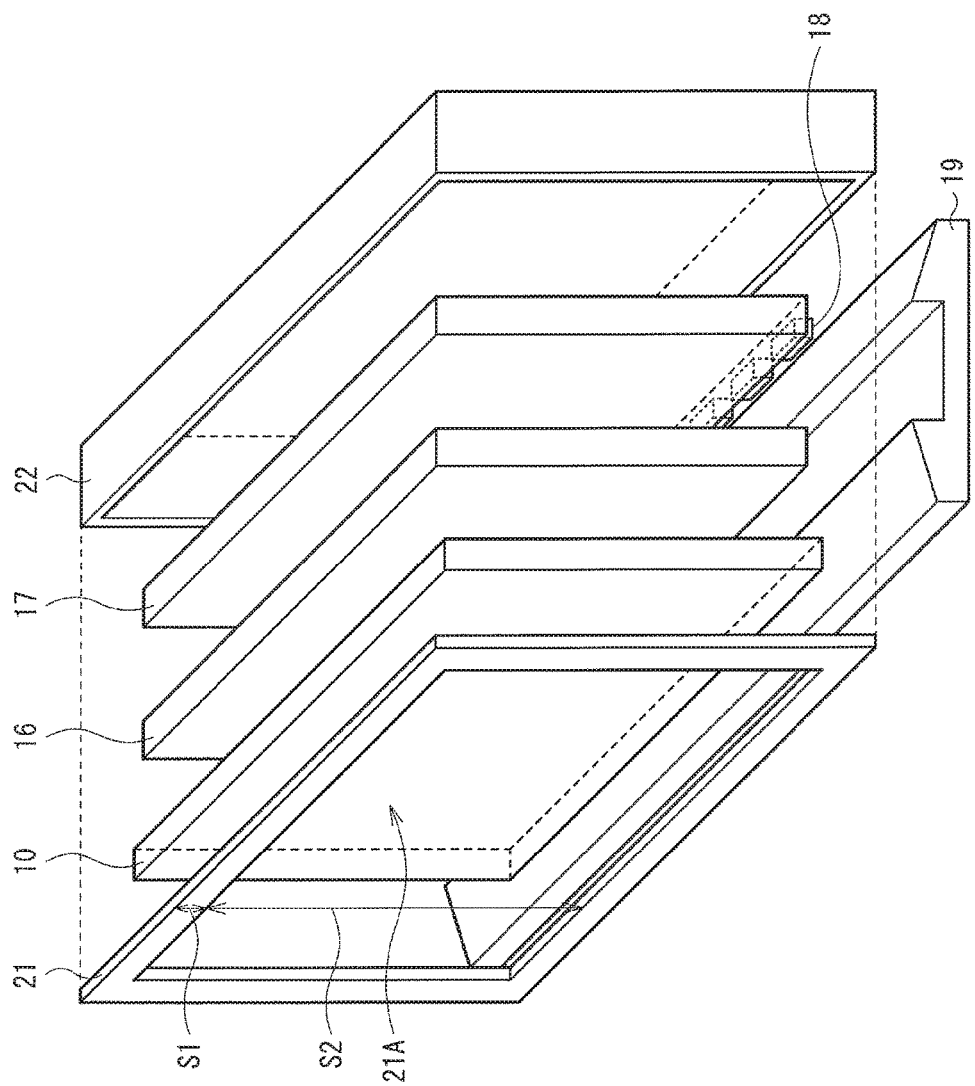
FIG. 2 is an exploded perspective view illustrating a configuration of the display depicted in FIG. 1.

FIG. 1 is a diagram illustrating a cross-sectional configuration of a display (a display 1) according to a first embodiment of the present disclosure, and FIG. 2 is an exploded perspective view illustrating an overall configuration of the display 1. The display 1 is, for example, a liquid crystal display used as a television device. This display 1 has a configuration in which: a backlight unit is housed in a housing 20 including a front bezel 21 (front-face member) and a back chassis 22 (back-face member); the backlight unit includes a display panel 10, an optical sheet 16, a light-guiding plate 17, a light source 18, and the like; and the front bezel 21 and the back chassis 22 are adhered to each other with an adhesion section 23. On one end surface of the light-guiding plate 17, a plurality of LEDs are arranged as a light source 18, and light emitted from this light source 18 irradiates the display panel 10 via the light-guiding plate 17, and is extracted as display light toward the front bezel 21.

The display panel 10 displays an image such as a moving image or a still image, and is, for example, a liquid crystal display panel having a liquid crystal layer 13 between two substrates, i.e., a TFT substrate 12 and a CF substrate 14. Further, polarizing plates 11 and 15 allowing polarized light in a specific direction to pass therethrough are provided on a surface (front face (display surface)) of the TFT substrate 12 and a surface (back face) of the CF substrate 14, respectively, the surfaces being opposite to surfaces where the liquid crystal layer 13 is provided.

The TFT substrate 12 is configured by, for example, arranging a plurality of pixel electrodes (not illustrated) in a matrix on a glass substrate. This TFT substrate 12 is provided with TFT (Thin Film Transistor) devices driving the respective pixel electrodes, gate lines as well as source lines connected to these TFT devices, and the like (none is illustrated). The pixel electrodes are formed of, for example, a conductive material having transparency such as ITO (Indium Tin Oxide), and are each provided for every sub-pixel (not illustrated) on the glass substrate.

The CF substrate 14 has a color filter (not illustrated) with, for example, stripe-shaped filters of red (R), green (G), and blue (B) on a glass substrate, and also has a counter electrode (not illustrated) over almost the entire surface of an effective display region S2 on this color filter. The counter electrode is configured using, for example, a conductive material having transparency such as ITO, like the pixel electrodes described above. It is to be noted that, although not illustrated here, a spacer may be provided between the counter electrode and the pixel electrodes on the TFT substrate 12 side, thereby keeping a gap between these substrates.

For example, in a case of a liquid crystal panel of a vertical alignment type, the liquid crystal layer 13 includes liquid crystal molecules having negative dielectric constant anisotropy, and a polymer structure holding the liquid crystal molecules in proximity to an interface with an alignment film (not illustrated). A liquid crystal molecule has a property in which a dielectric constant in a major axis direction is larger than that in a minor axis direction. Based on this property, the liquid crystal molecule is arranged to allow the major axis of the liquid crystal molecule to be perpendicular to a substrate when a drive voltage is OFF, and the liquid crystal molecule is oriented to allow the major axis of the liquid crystal molecule to be parallel to the substrate when the drive voltage is ON. Thus, an image is displayed on a liquid crystal display panel.

The optical sheet 16 is a sheet implementing various optical functions for the light being emitted from the light source 18 and irradiating the display panel 10 through the light-guiding plate 17. As the optical sheet 16, a sheet may be provided in a single layer or a laminated layer. The sheet has, for example, a function of decomposing display light entering the display panel 10 from the light source 18 through the light-guiding plate 17, into incident light and a polarized light component orthogonal to the incident light, a function of achieving a wide viewing angle or prevention of coloring by ensuring a phase difference between light waves, a function of diffusing the display light, or the like.

The light-guiding plate 17 allows the light entering from the light source 18 to propagate therethrough, thereby guiding this light to the display panel 10, and has, for example, a rectangular flat shape. As a material of the light-guiding plate 17, a material having high transparency such as glass may be used, but the light-guiding plate 17 may be configured using other materials as long as the material allows the light from the light source 18 to propagate therethrough. For example, a light scattering material in which light scattering fine particles are dispersed, or a light diffusion material may be employed to form the light-guiding plate 17. Specifically, acrylic resin, polymethyl methacrylate (PMMA), polycarbonate (PC), cyclic polyolefin (COP), or the like may be used. A shape, a size, a refractive index, a density, a density distribution, and the like of the light-guiding plate 17 may be adjusted freely to obtain desired characteristics.

For the light source 18, for example, in addition to a white LED (Light Emitting Diode), LEDs emitting light of red, blue, green, and the like may be used. Further, other than a point light source such as LED, a line light source such as a fluorescent light may be used. As illustrated in FIG. 2, here, the light source 18 is provided on the one end surface (undersurface) of the light-guiding plate 17, but is not limited to this, and may be disposed along four sides of the light-guiding plate 17.

The housing 20 is, for example, substantially shaped like a rectangular solid, and has two opposed surfaces, namely, a display surface and a back face, and also has side faces between these two surfaces. The housing 20 in the present embodiment is configured to include a front-face plate (the front bezel 21) and a back-face plate (the back chassis 22). The front-face plate covers a part of a front face of the display panel 10, and the back-face plate covers a back face as well as side faces between the front face and the back face of the display panel 10.

The front bezel 21 is a frame used to fix the display panel 10 provided on the front-face side of the display panel 10, as described above. The front bezel 21 has an opening 21A, and this opening 21A allows an image displayed on the display panel 10 to be viewed. As a material of the front bezel 21, for example, metal having a high thermal conductivity, specifically, aluminum (Al), is used. Besides this, iron (Fe), polycarbonate (PC), plastic in which ABS resin is added to PC, or the like can be used.

The back chassis 22 is also used to fix the display panel 10, while covering at least the back face of the display panel 10, and, here, covering the back face and the side faces between and the front face and the back face of the display panel 10 as described above. As a material of the back chassis 22, for example, metal having a high thermal conductivity, specifically, Al is used, like the front bezel 21. Besides this, Fe or the like can be used.

In the present embodiment, the front bezel 21 and the back chassis 22 are adhered to each other with the adhesion section 23. A connection member (for example, a middle chassis or the like) used to connect the front bezel 21 and the back chassis 22 is omitted by integrating the front bezel 21 and the back chassis 22 with this adhesion section 23. Examples of the adhesion section 23 include adhesives of sufficient adhesive strength and elasticity, which are, specifically, adhesives such as acrylic resin, urethane resin, epoxy resin, vinyl chloride resin, and modified silicone resin. Further, when the front bezel 21 and the back chassis 22 are adhered to each other with the adhesion section 23 as in the present embodiment, it is preferable to configure the front bezel 21 and the back chassis 22 with the same material, thereby improving bond strength and the like. For example, it is preferable that a metallic material be used to provide shielding against electromagnetic waves produced by various circuits and electronic components provided inside the display 1. This reduces undesirable radiation produced by the various circuits and electronic components provided inside the display 1.

It is to be noted that here, the adhesion section 23 also has a function of serving as a sealing section of the display panel 10, by covering part of the side faces, the front face, and the back face of the display panel 10. Further, a spacer 24 is provided between the display panel 10 and the back chassis 22, thereby securing a space between the display panel 10 and the back chassis 22 and also partitioning a region where the adhesion section 23 is formed. Furthermore, a piece of PORON 25 positioning the light-guiding plate 17 and absorbing linear expansion of the light-guiding plate 17 is provided between the spacer 24 and the light-guiding plate 17, but may be omitted.

As illustrated in FIG. 2, the display 1 is completed by housing the display panel 10, the optical sheet 16, the light-guiding plate 17, and the like in the housing 20 including the front bezel 21 and the back chassis 22, and then by installing the housing 20 in a stand 19 provided with a drive substrate of the light source 18, a speaker, and the like. The stand 19 has, for example, a structure being fixed to a base and having a rectangular flat shape, but is not limited to this, and may have a tilt-swivel mechanism capable of changing an orientation of a screen of the display panel 10 vertically and laterally.

In this display 1, when the light emitted from the light source 18 is incident on the display panel 10 through the light-guiding plate 17 and the optical sheet 16, the incident light passes through the polarizing plate 11 and then passes through the liquid crystal layer 13 while being modulated for every pixel, based on an image voltage applied between transparent electrodes of the TFT substrate 12 and the CF substrate 14. After passing through the liquid crystal layer 13, the light passes through the color filter, thereby being extracted as color display light to an outer side (a surface side) of the polarizing plate.

Figure 6:
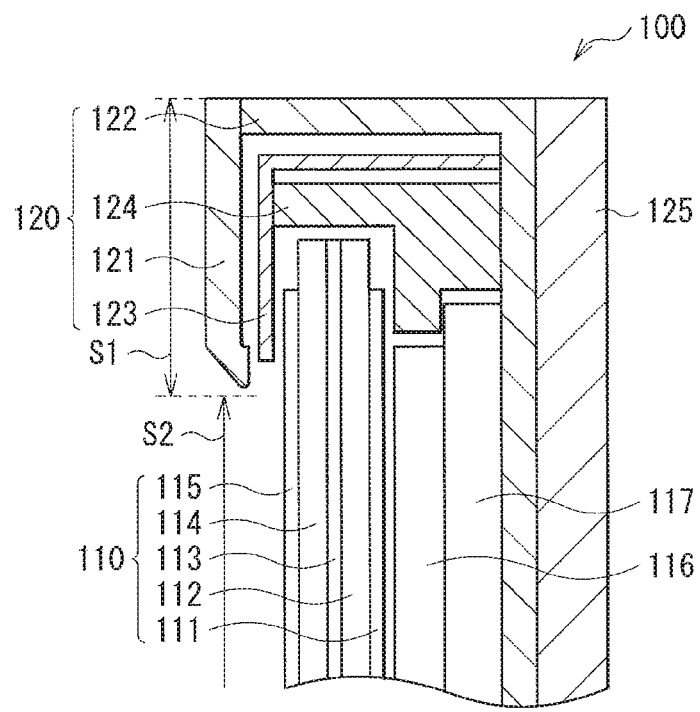
FIG. 6 is a cross-sectional diagram illustrating a configuration of a display according to an example of a related art.

FIG. 6 illustrates a cross-sectional configuration of a display 100 of a related art. In the display 100, a display panel 110, an optical sheet 116, and a light-guiding plate 117 are housed in a housing 120, like the display 1 of the above-described present embodiment. This housing 120 is configured to include a front bezel 121, a back chassis 122, a top chassis 123, and a middle chassis 124. In the display 100 of the related art, the top chassis 123 and the middle chassis 124 are disposed between the front bezel 121 and the back chassis 122, and the front bezel 121 and the back chassis 122 are connected by this top chassis 123 and the middle chassis 124. Specifically, the top chassis 123 and the back chassis 122 are fixed with screws (not illustrated) with the middle chassis 124 in between. A panel module assembled in this way is held between the front bezel 121 and a rear cover 125, and is fixed with screws (not illustrated). Therefore, it is necessary that a region used to fix the housing 120 with the screws is provided in a frame region 51 of the display 100. In addition, the number of components including the top chassis 123, the middle chassis 124, the screws, and the like is large, which increases weight.

In contrast, in the display 1 of the present embodiment, the housing 20 has two components, namely, the front bezel 21 and the back chassis 22, and the front bezel 21 and the back chassis 22 are adhered to each other with the adhesion section 23. In other words, a region similar to the region used to fix the housing 120 with the screws in the frame region S1 of the display 100 of the related art may not necessarily be secured, and thus, it is possible to reduce the frame region S1. In addition, connection members (the top chassis 123, the middle chassis 124, and the screws) connecting the front bezel 121 and the back chassis 122 may be unnecessary and thus, cost is allowed to be slimmed down, and weight of the display 1 is allowed to be reduced.

As described above, in the display 1 of the present embodiment, the front bezel 21 and the back chassis 22 configuring the housing 20 are adhered to each other by the adhesion section 23 and thus, it is possible to reduce a region used to connect the members of the housing 20, in the frame region S1 of the display 1. In other words, it is possible to narrow the frame of the display 1.

Moreover, a connection member used to connect the members (the front bezel 21 and the back chassis 22) of the housing 20 may be unnecessary and thus, it is possible to slim the cost and reduce the weight of the display 1.

The second to fourth embodiments will be described below. It is to be noted that the same elements as those of the first embodiment will be provided with the same characters and thus, the description thereof will be omitted.

2. Second Embodiment

Figure 3:
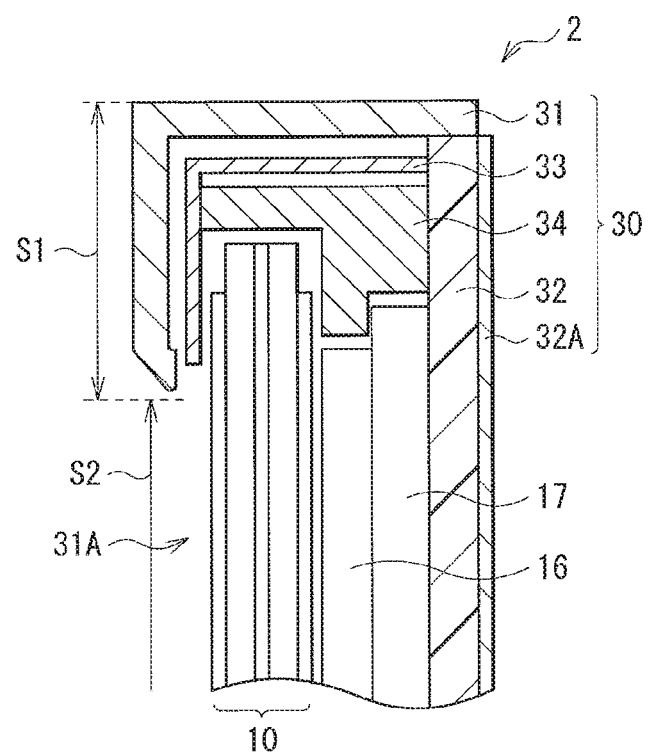
FIG. 3 is a cross-sectional diagram illustrating a configuration of a display according to a second embodiment of the present disclosure.

FIG. 3 illustrates a cross-sectional configuration of a display 2 according to the second embodiment of the present disclosure. The display 2 includes a display panel 10, an optical sheet 16, and a light-guiding plate 17 housed in a housing 30, and the display 2 is different from the display of the first embodiment in that this housing 30 includes a front bezel 31 (front-face member), a rear plate 32 (back-face member), a top chassis 33, and a middle chassis 34.

Like the first embodiment, the housing 30 is, for example, substantially shaped like a rectangular solid, and has two opposed surfaces, namely, a display surface and a back face, and also has side surfaces between these two surfaces. In the present embodiment, the front bezel 31 and the rear plate 32 are connected by the top chassis 33 and the middle chassis 34. The front bezel 31 serves as a front-face plate covering a display surface (front face) and side faces of the display panel 10. The rear plate 32 serves as a back-face plate covering a back face of the display panel 10.

The front bezel 31 is a frame used to fix the display panel 10, like the first embodiment. The front bezel 31 has an opening 31A, and this opening 31A allows an image displayed on the display panel 10 to be viewed. As a material of the front bezel 31, for example, metal having a high thermal conductivity, specifically, Al is used. Besides this, Fe, polycarbonate (PC), plastic in which ABS resin is added to PC, or the like may be used.

The rear plate 32 is provided to cover the back face of the display panel 10 as described above, and also to support the entire display 2. The rear plate 32 is a member having rigidity. Further, it is preferable to use a member having a high Young's modulus or a low linear expansion coefficient. Specifically, glass, ceramic, or metal such as Al and Fe, having a thickness of about 1.0 mm to about 3.0 mm both inclusive may be used. In the present embodiment, the member having rigidity is used as the back-face member of the housing 30. Therefore, it is possible to support the entire display 2 without using the back chassis 22 and a support member such as an outer member (for example, the rear cover 125 (see FIG. 6)).

Further, on the entire back face of the rear plate 32, a light-shielding film 32A is provided to prevent external light from entering into the display 2. Examples of this light-shielding film 32A include a resin film such as a black film into which a black coloring agent is mixed and which has an optical density of about 1 or more.

The top chassis 33 and the middle chassis 34 are provided to connect the front bezel 31 and the rear plate 32 as described above. Examples of a material of each of the top chassis 33 and the middle chassis 34 include metal such as Al or Fe, similar to the material of the back chassis 22 in the first embodiment. It is to be noted that the top chassis 33 and the middle chassis 34 may be molded using a material having a thermal conductivity lower than that of metal, which is, for example, a synthetic resin or the like. Use of the material having a low thermal conductivity suppresses transmission of heat produced in a light source 18 to the front bezel 31, and makes it possible to radiate heat from the back-face side efficiently, while suppressing a temperature rise on the front-face side of the display 2.

In this display 2, light emitted from the light source 18 is incident on the display panel 10 through the light-guiding plate 17 and the optical sheet 16, in a manner similar to the first embodiment. This incident light passes through a polarizing plate 11, and then passes through a liquid crystal layer 13, while being modulated for every pixel, based on an image voltage applied between transparent electrodes of a TFT substrate 12 and a CF substrate 14. After passing through the liquid crystal layer 13, the light passes through a color filter, thereby being extracted as color display light to an outer side (a surface side) of the polarizing plate.

FIG. 6 illustrates the cross-sectional configuration of the display 100 of the related art. On the back face of this display 100, a back-face housing including the back chassis 122 and the like, and the outer member including the rear cover 125 and the like are provided to house the display panel 110 and support the entire display 100.

In contrast, in the display 2 of the present embodiment, the back-face plate (the rear plate 32) having rigidity is used for the entire back face of the display panel 10, of the housing 30 accommodating the display panel 10. This allows one member to serve in place of a plurality of members including the back chassis 122, the rear cover 125, and the like used to support the typical display 100.

As described above, in the display 2 of the present embodiment, the material having rigidity is used for the back-face plate covering the entire back face of the display panel 10 and thus, the display panel, which is supported using, in the related art, the plurality of members including the back chassis 122, the rear cover 125, and the like, is allowed to be supported with one member (the rear plate 32). In other words, it is possible to make the display 2 thinner.

Further, it is possible to reduce the number of components of the display 2 and thus, cost is allowed to be slimmed down, and the weight is allowed to be reduced compared with the display 1.

3. Third Embodiment

Figure 4:
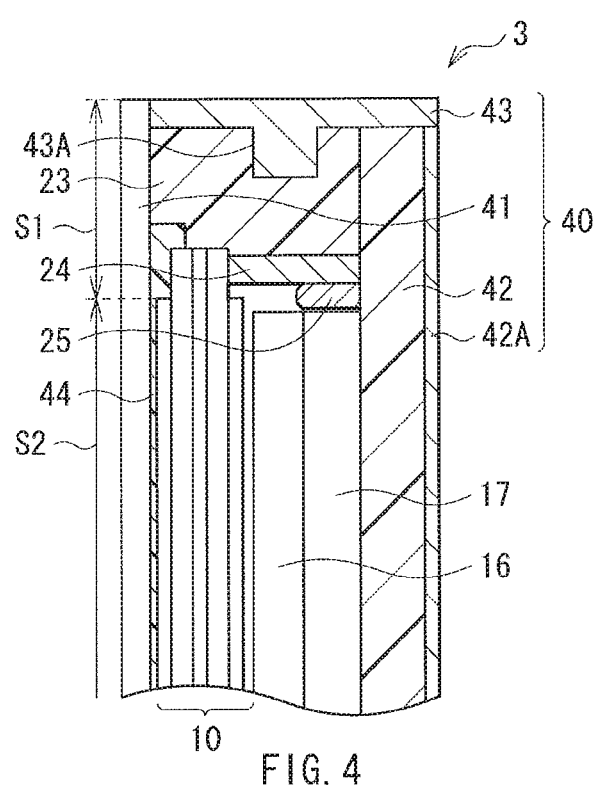
FIG. 4 is a cross-sectional diagram illustrating a configuration of a display according to a third embodiment of the present disclosure.

FIG. 4 illustrates a cross-sectional configuration of a display 3 according to a third embodiment of the present disclosure. The display 3 includes a display panel 10, an optical sheet 16, and a light-guiding plate 17 housed in a housing 40, and the display 3 is different from the first and second embodiments in that this housing 40 is configured to include a front glass 41 (front-face member), a rear plate 42 (back-face member), and a decoration frame 43, the front glass 41 being provided on a front face of the display panel 10 with a sealing layer 44 in between. It is to be noted that, the front glass 41 (front-face member), the rear plate 42 (back-face member), and the decoration frame 43 are adhered to one another with an adhesion section 23.

The front glass 41 is a plate-like member provided on the entire front face of the display panel 10 with the sealing layer 44 in between as described above, and is configured using a material of high transparency, such as glass, polycarbonate (PC), and plastic in which ABS resin is added to PC. The front glass 41 has, for example, a thickness of about 0.5 mm to about 3.5 mm both inclusive, and protects an display region S2 of the display panel 10, and also supports the display 3 in cooperation with the rear plate 42 which will be described later.

The rear plate 42 is provided to cover the entire back-face side of the display panel 10 as described above, and also to support the entire display 3, like the second embodiment. The rear plate 42 is a member having rigidity, and is made of, for example, glass or metal such as Al and Fe having a thickness of about 1.0 mm to about 3.0 mm both inclusive. In addition, the front glass 41 and the rear plate 42 are adhered to each other with the adhesion section 23 as described above and thus, it is preferable to use materials having the same or similar properties as the materials of the front glass 41 and the rear plate 42. Specifically, it is desirable to use glass in view of transparency desired for the front glass 41, rigidity desired for a support member of the display, and a difference in expansion coefficient with respect to the display panel 10. Further, on the entire back face of the rear plate 42, a light-shielding film 42A is provided to prevent entrance of external light into the display 3, like in the second embodiment.

The decoration frame 43 is provided to cover side faces between a front face and a back face of the display 3, and also to seal the adhesion section 23 used to connect the front glass 41 and the rear plate 42. As a material of the decoration frame 43, for example, the material of the back chassis 22 in the first embodiment, namely, metal such as Al and Fe may be used. It is to be noted that the decoration frame 43 may be a flat-plate-like member, but as illustrated in FIG. 4, an amount of the adhesion section 23 used to adhere the front glass 41 and the rear plate 42 to each other may be reduced by providing a protrusion section 43A in a sealing direction of the adhesion section 23. In addition, positioning of members of the display 3 (for example, see FIG. 5) may be performed by appropriately adjusting a position where the protrusion section 43A is formed.

The sealing layer 44 is provided to seal between the display panel 10 and the front glass 41, and may be configured using, for example, resin or the like having a photo-hardening property, a thermosetting property, a moisture-curing property, an aerobic-curing property, or a hot-melt property, or any combinations of these properties. It is to be noted that the sealing layer 44 may be omitted, but by sealing a space between the display panel 10 and the front glass 41 with the sealing layer 44, strength is increased and also image quality is enhanced. Moreover, designability is also improved.

In the display 3 of the present embodiment, the materials having rigidity and the same or similar properties are used for the front glass 41 and the rear plate 42 configuring the housing 40, and the front face and the back face of the display panel are covered by the front glass 41 and the rear plate 42. This simplifies a back-face member provided on the back-face side of the display panel 10, such as a back-face housing, an outer member, and the like, and thereby it is possible to reduce thickness of the display 3. Furthermore, since the front glass 41 and the rear plate 42 are adhered to each other by the adhesion section 23, it is possible to reduce a frame region S1. In other words, it is possible to make the display 3 thinner and narrow the frame thereof at the same time.

4. Fourth Embodiment

Figure 5:
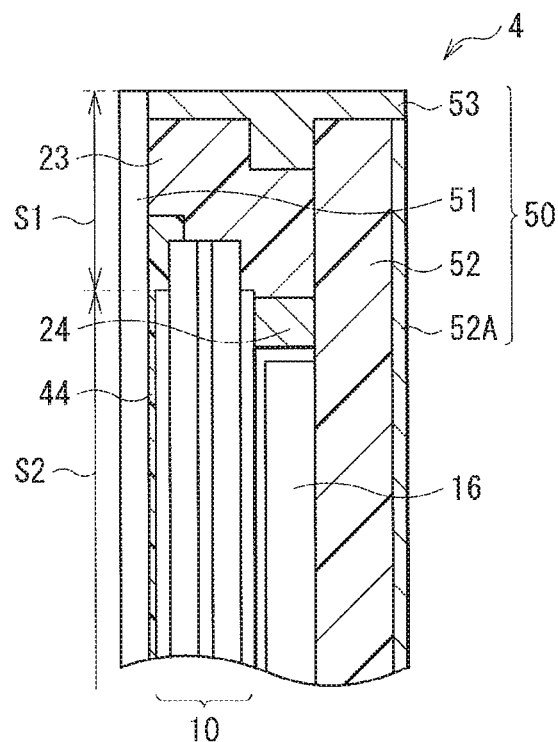
FIG. 5 is a cross-sectional diagram illustrating a configuration of a display according to a fourth embodiment of the present disclosure.

FIG. 5 illustrates a cross-sectional configuration of a display 4 according to a fourth embodiment of the present disclosure. In the display 4, a display panel 10 and an optical sheet 16 are housed in a housing 50, and this housing 50 is configured using a front glass 51 (front-face member) provided on a front face of the display panel 10 with a sealing layer 44 in between, a light-guiding plate 52 (back-face member), and a decoration frame 53. In the display 4 of the present embodiment, the light-guiding plate 52 is used as a back-face member, which is different from the first to third embodiments. It is to be noted that the front glass 51 (front-face member), the light-guiding plate 52 (back-face member), and the decoration frame 53 are adhered to one another with an adhesion section 23.

Like the third embodiment, the front glass 51 is provided on the front face of the display panel 10, and is made of a material having high transparency, such as glass, polycarbonate (PC), and plastic in which ABS resin is added to PC. The front glass 51 has, for example, a thickness of about 0.5 mm to about 3.5 mm both inclusive, and protects a display region S2 of the display panel 10 and also supports the display 4 in cooperation with the light-guiding plate 52 which will be described later.

The light-guiding plate 52 covers the entire back face of the display panel 10, and may be configured using a material having the same or similar property as that of the front glass 51, which is, for example, a member having rigidity and capable of supporting the entire display 4, like the third embodiment. Specifically, for example, glass or metal such as Al and Fe having a thickness of about 1.0 mm to about 3.0 mm both inclusive may be used. Further, on the entire back face of the light-guiding plate 52, a light-shielding film 52A is provided to prevent entrance of external light into the display 4. This light-shielding film 52A is configured using, for example, a resin film such as a black film into which a black coloring agent is mixed and which has an optical density of about 1 or more, like the second and third embodiments. Of these, a black resin film is preferable to use, because the light-shielding film 52A is allowed to be formed easily at a low cost.

The decoration frame 53 is provided to cover side faces between a front face and a back face of the display 4, and also to seal the adhesion section 23 connecting the front glass 51 which is the front-face member to the light-guiding plate 52 which is the back-face member, like the third embodiment. As a material of the decoration frame 53, a material similar to that in the third embodiment may be used.

In the display 4 of the present embodiment, the light-guiding plate 52 configured using the material having transparency and rigidity is provided as a back-face plate covering the back face of the display panel 10 and thus, it is possible to further reduce thickness of the display 4, in addition to achieving effects similar to those of the third embodiment. Further, it is possible to reduce the number of components of the display 4 and thus, an effect of further reducing cost is achieved.

The present technology has been described using the first to fourth embodiments, but the present technology is not limited to these embodiments and may be variously modified. For example, the liquid crystal display is used as an example of the display 1 in the above-described embodiment, but the housing 20 may be applied to a plasma display, an organic electroluminescence display, and the like.

Further, each of the members and thicknesses in the embodiments is described as an example. Not all the members may necessarily be provided, or other members may be further provided. For example, as a system of radiating heat produced by the light source 18, a heat sink may be adhered to a part or all of the back face of the display, for example, to a lower end part where the light source 18 is provided. For the heat sink, it is desirable to use metal superior in thermal conductivity, and, for example, a material formed by molding a block made of Al or the like may be used. Further, in the display described in each of the embodiments, the polarizing plate is provided on a surface of the display panel, but is not limited to this example, and may be, for example, provided on a surface of the front glass.

It is possible to achieve at least the following configurations from the above-described example embodiments and the modifications of the disclosure.

(1) A display including:
  a display panel;
  a front-face member being provided on a front face of the display panel, and the front-face member covering a surrounding section, or the surrounding section and other part of the display panel; and
  a back-face member having rigidity and being provided on a back face of the display panel, the back-face member covering the back face, or the back face and other part of the display panel.

(2) The display according to (1), wherein the front-face member is a frame provided at an outer edge section of the display panel.

(3) The display according to (1) or (2), wherein the front-face member is a transparent plate covering the front face of the display panel.

(4) The display according to any one of (1) to (3), wherein the front-face member and the back-face member are made of a same material.

(5) The display according to any one of (1) to (4), wherein each of the front-face member and the back-face member is made of glass.

(6) The display according to any one of (1) to (5), further including:
  a backlight unit including a light source, an optical sheet, and a light-guiding plate, the backlight unit being provided between the display panel and the back-face member, wherein
  the light-guiding plate serves as the back-face member.

(7) The display according to any one of (1) to (6), further including:
  a top chassis and a middle chassis between the front-face member and the back-face member.

(8) The display according to any one of (1) to (7), wherein the front-face member and the back-face member are adhered to each other by an adhesion section.

The present disclosure contains subject matter related to that disclosed in Japanese Priority Patent Application JP 2011-116243 filed in the Japan Patent Office on May 24, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display device comprising:
  a display panel; and
  a housing having the display panel arranged inside,
  said housing having (i) a front-face member being provided on a front face of the display panel, (ii) a back-face member having rigidity and being provided on a back face of the display panel, the back-face member covering the back face, and (iii) a side-face member provided at a side face of the display panel,
  the front-face member and the back-face member being adhered to each other by adhesive in an adhesion section to form the housing such that an outer surface of the front-face member forms an outermost surface of the display device, in which the adhesive of the adhesion section extends from a first face of the front-face member to a second face of the back-face member, and in which the first face confronts the second face, and in which the side-face member is adhered to the adhesion section and includes a protrusion section extending from an inside surface of the side-face member in a direction of the adhesion section, wherein positioning of a member of the display device is determined according to contact between the member and the side-face member along a surface portion of the inside surface of the side-face member extending from the protrusion section and facing in the direction of the adhesion section.

2. The display device according to claim 1, wherein the front-face member is a frame provided at an outer edge section of the display panel.

3. The display device according to claim 1, wherein the front-face member is a transparent plate covering the front face of the display panel.

4. The display device according to claim 1, wherein the front-face member and the back-face member are made of a same material.

5. The display device according to claim 1, wherein the front-face member is made of glass.

6. The display device according to claim 1, further comprising:
a light-guiding plate opposing the back face of the display panel.

7. The display device according to claim 1, wherein another member serving as at least a portion of the back-face member is made of glass.

8. The display device according to claim 1, wherein the front-face member and the back-face member are made of a same material.

9. The display device according to claim 1, wherein the front-face member and the back-face member are made of glass.

10. The display device according to claim 1, further comprising:
a light-guiding plate serving as the back-face member.

11. A display device comprising:
a display panel; and
a housing having the display panel arranged inside,
said housing having (i) a front-face member being provided on a front face of the display panel, (ii) a back-face member having rigidity and being provided on a back face of the display panel, the back-face member covering the back face, and (iii) a side-face member provided at a side face of the display panel,
the front-face member and the back-face member being adhered to each other by adhesive in an adhesion section, in which the adhesive of the adhesion section extends from a first face of the front-face member to a second face of the back-face member, and in which the first face confronts the second face, and in which the side-face member is adhered to the adhesion section and includes a protrusion section extending from an inside surface of the side-face member in a direction of the adhesion section,
wherein positioning of a member of the display device is determined according to contact between the member and the side-face member along a surface portion of the inside surface of the side-face member extending from the protrusion section and facing in the direction of the adhesion section;
a light shielding film being provided on a rear face of the back-face member; and
an outer surface of the front-face member and an outer surface of the light shielding film on the rear face of the back-face member form outermost surfaces of the display device.

12. The display device according to claim 11, wherein the front-face member is a transparent plate covering the front face of the display panel.

13. The display device according to claim 11, wherein the front-face member and the back-face member are made of a same material.

14. The display device according to claim 11, wherein each of the front-face member and the back-face member is made of glass.

15. The display device according to claim 11, wherein a light-guiding plate serves as the back-face member.

* * * * *